Figures 1, 2:
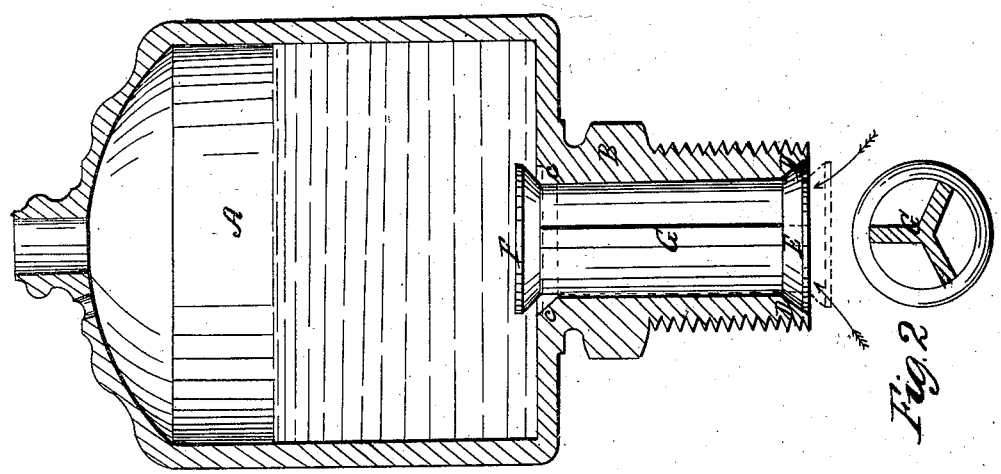

D. Clark.
Lubricator

Nº 10,399.   Patented Jan. 10, 1854.

UNITED STATES PATENT OFFICE.

DAVID CLARK, OF PHILADELPHIA, PENNSYLVANIA.

OIL-CUP FOR STEAM-ENGINES.

Specification of Letters Patent No. 10,399, dated January 10, 1854.

*To all whom it may concern:*

Be it known that I, DAVID CLARK, of Philadelphia, in the county of Philadelphia and State of Pennsylvania, have invented a new and useful Self-Acting Oil-Cup; and I do hereby declare that the following is a full, clear, and exact description of the same, reference being had to the accompanying drawings, forming part of this specification, in which—

Figure 1, is a vertical central section of the oil cup. Fig. 2, is a horizontal section of the stem which carries the valves.

Similar letters of reference in each of the two figures indicate corresponding parts.

The nature of my invention consists in constructing the lower extremity of the oil cup with two conical valve seats in which two similar valves, connected together by a stem, fit and open and close alternately and let on and shut off the supply of oil simultaneously with the letting on and shutting off of the steam. The steam when let on causing the lower valve to shut off the supply of oil to the packing, and when shut off allowing the lower valve to open and the upper one to close and the oil which collects in the chamber between the valves to flow out freely. Thus it will be seen that it only depends upon the agency of steam and gravity to render the oil cup perfect in its operation, which agents thus employed always effect perfectly the object aimed at—which is to cause the valves to supply lubricating material to the packing and other parts necessary at the proper time, and at the same time prevent its too rapid escape and descent into the cylinder, and also prevent the ascent of the steam into the oil cup.

To enable others to understand more fully the construction and operation of my invention I will proceed to describe it more minutely.

A, represents the body or main portion of the oil cup in which the oil or lubricating material is contained, and B, represents the lower extremity, in which two conical valve seats C, D, are formed. This portion is made smaller in diameter than the part A and has a screw cut on its outer surface, by which it is secured in its place permanently, it being secured in the top of the valve chest or other convenient place, and made to communicate with the interior of the same, when the conical valve seat D, at its bottom, is opened. The body A, and stem B, are hollow and communicate with each other when the conical valve F, is opened, the fluid running down into the chamber of the part B, and is retained there by the valve E, until said valve opens, which takes place when the steam is cut off, simultaneous with which the top valve F, closes and shuts off the flow of oil into the chamber B. These valves are connected together by the stem G, as shown in Fig. 1. This stem has three wings to guide its up and down movements, which form chambers for the oil to escape through, as seen in Fig. 2.

The operation is as follows: The part A, of the cup being filled with oil, as indicated by the color, and the upper valve closed, and the lower one opened, as shown by red lines in Fig. 1, the steam may be let on, the force of which, in the direction shown by the arrows instantly presses the lower valve E, into its seat D, and causes the upper one F, to rise out of its seat C, as shown by black lines, and allow the oil to flow upon the lower valve E, and fill the chamber B, between the two halves, and as the lower valve is always kept closed by the pressure of the steam consequently the oil is prevented escaping into the cylinder and the steam passing into the oil cup. Now by shutting off the steam the lower valve opens and the oil occupying the chamber B, allowed to escape and perform its duty and simultaneous therewith the upper valve falls by its gravity into its seat and shuts off the supply.

The advantages derived from the use of this cup are, 1st, it is self acting and requires no attention after being filled; 2nd, the oiling is done at the time when the packing is most liable to cut in consequence of there being no steam in the cylinder.

What I claim as my invention and desire to secure by Letters Patent, is—

Constructing the oil cup in the manner described or in any other equivalent thereto, so that the flow of the oil from the chamber A, into and from the chamber B, may be regulated wholly by the agency of steam and gravity as set forth and specified herein.

DAVID CLARK.

Witnesses:
HENRY SIMPSON,
DANIEL McKINLEY.